United States Patent
Trivedi et al.

(10) Patent No.: US 9,292,465 B2
(45) Date of Patent: Mar. 22, 2016

(54) DYNAMIC LINK WIDTH ADJUSTMENT

(75) Inventors: Malay Trivedi, Chandler, AZ (US);
Mohan K. Nair, Portland, OR (US);
Joseph Murray, Scottsdale, AZ (US);
Devadatta V. Bodas, Federal Way, WA (US); James W. Alexander, Hillsboro, OR (US); Vijayendra K. Hoskoti, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 243 days.

(21) Appl. No.: 13/993,106

(22) PCT Filed: Dec. 21, 2011

(86) PCT No.: PCT/US2011/066414
§ 371 (c)(1),
(2), (4) Date: Jun. 11, 2013

(87) PCT Pub. No.: WO2013/095422
PCT Pub. Date: Jun. 27, 2013

(65) Prior Publication Data
US 2014/0019654 A1 Jan. 16, 2014

(51) Int. Cl.
*G06F 13/42* (2006.01)
*G06F 13/38* (2006.01)

(52) U.S. Cl.
CPC .............. *G06F 13/42* (2013.01); *G06F 13/387* (2013.01); *G06F 2213/0026* (2013.01); *Y02B 60/1228* (2013.01); *Y02B 60/1235* (2013.01)

(58) Field of Classification Search
CPC .......................... G06F 13/42; G06F 2213/0026
See application file for complete search history.

(56) References Cited

U.S. PATENT DOCUMENTS

| | | | | |
|---|---|---|---|---|
| 7,136,953 | B1 * | 11/2006 | Bisson et al. | 710/307 |
| 7,197,591 | B2 * | 3/2007 | Kwa et al. | 710/307 |
| 7,370,132 | B1 * | 5/2008 | Huang et al. | 710/307 |
| 7,426,597 | B1 * | 9/2008 | Tsu et al. | 710/307 |
| 7,660,925 | B2 * | 2/2010 | Larson et al. | 710/107 |
| 7,809,869 | B2 * | 10/2010 | Atherton et al. | 710/104 |
| 8,189,573 | B2 * | 5/2012 | Congdon et al. | 370/360 |

(Continued)

FOREIGN PATENT DOCUMENTS

| | | |
|---|---|---|
| TW | 200819960 | 5/2008 |
| TW | 201022950 | 6/2010 |

OTHER PUBLICATIONS

International Searching Authority, "Notification of Transmittal of the International Search Report and the Written Opinion of the International Searching Authority," mailed Dec. 21, 2011, in International application No. PCT/US2011/066414.

(Continued)

*Primary Examiner* — Glenn A Auve
(74) *Attorney, Agent, or Firm* — Trop, Pruner & Hu, P.C.

(57) ABSTRACT

Embodiments help dynamically configure the width of PCIe links and also determine how to best configure the appropriate link width. This helps avoid situations where PCIe links are almost always active even at very low traffic rates. Embodiments achieve these benefits based on, for example, run-time monitoring of bandwidth requirement for integrated and non-integrated ports located downstream for the PCIe controller. This provides power savings with little impact on performance. Other embodiments are discussed herein.

19 Claims, 7 Drawing Sheets

(56) References Cited

U.S. PATENT DOCUMENTS

| | | | |
|---|---|---|---|
| 2005/0270988 A1* | 12/2005 | DeHaemer | 370/254 |
| 2005/0283561 A1* | 12/2005 | Lee et al. | 710/307 |
| 2006/0034295 A1 | 2/2006 | Cherukuri | |
| 2007/0067548 A1* | 3/2007 | Juenger | 710/315 |
| 2007/0094437 A1* | 4/2007 | Jabori et al. | 710/307 |
| 2007/0147359 A1* | 6/2007 | Congdon et al. | 370/360 |
| 2007/0232254 A1 | 10/2007 | Mackey | |
| 2008/0002585 A1* | 1/2008 | Safranek et al. | 370/235 |
| 2008/0005706 A1* | 1/2008 | Sharma et al. | 716/4 |
| 2008/0263246 A1* | 10/2008 | Larson et al. | 710/107 |
| 2009/0006708 A1* | 1/2009 | Lim | 710/314 |
| 2009/0164684 A1* | 6/2009 | Atherton et al. | 710/300 |
| 2010/0316065 A1* | 12/2010 | Kapil et al. | 370/465 |
| 2013/0159761 A1* | 6/2013 | Baumgartner et al. | 714/4.5 |

OTHER PUBLICATIONS

Taiwan Patent Office "Official Letter of Examiner's Preliminary Rejection/Search Report" R.O.C. (Taiwanese) Patent Application No. 101148666, 9 pages.

* cited by examiner

DYNAMIC LINK WIDTH ADJUSTMENT

BACKGROUND

Platforms (e.g., server platforms) require a performance/power loadline from input/output (I/O) devices, where power consumption is expected to reduce at lower bandwidth utilization. Peripheral component interconnect express (PCIe) devices include lower power states for the platform to utilize during periods of low performance. However, observations of actual server workload characterization show that PCIe link power states (e.g., L0, L1) offer less than ideal power savings as a function of utilization. For example, the L1 state offers power savings at or near OS Idle, but the link is predominantly active—even at very low bandwidth utilization (e.g., <5%). Owing to the nature of I/O traffic (e.g., server I/O traffic), timeout based link power management states have very low residency. Thus, such states exist but they are not adequately utilized.

Consequently, I/O power is inefficiently utilized at the component level and at the platform level (e.g., inappropriate fan speed and corresponding current draw). There are also resulting thermal inefficiencies due to a lack of adequate thermal throttling in the event of thermal excursions.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

An embodiment includes a policy, implemented via hardware and/or software modules, for dynamically adjusting the width of links (e.g., PCIe links) based on runtime tracking of I/O bandwidth requirements and/or thermal monitors. Such an embodiment provides power savings when the bandwidth utilization is below the native link width and speed. Such an embodiment may further provide temperature reduction during periods of temporary thermal excursions. In an embodiment, the policy resides within the downstream component and cooperates with an upstream component that allows or complies with the link width configuration being negotiated by the downstream component.

An embodiment includes a downstream PCIe component that may have integrated endpoints (also sometimes referred to herein as "ports"). An example of such a downstream component includes a Serial Attached Small Computer System Interface (SAS) controller included on a system on a chip (SOC) that also includes a PCIe controller. The endpoints are located on the SOC and are thus "integrated" endpoints.

However, another embodiment may include a downstream PCIe component with PCIe ports or endpoints that supports PCIe endpoints further downstream. For example, such a downstream port may include storage controllers not integrated onto the SOC that includes the PCIe controller. Such a component may include a discrete PCIe Ethernet card or storage controller that is attached to "downstream" PCIe ports of, for example, the PCIe controller.

Figure 1:
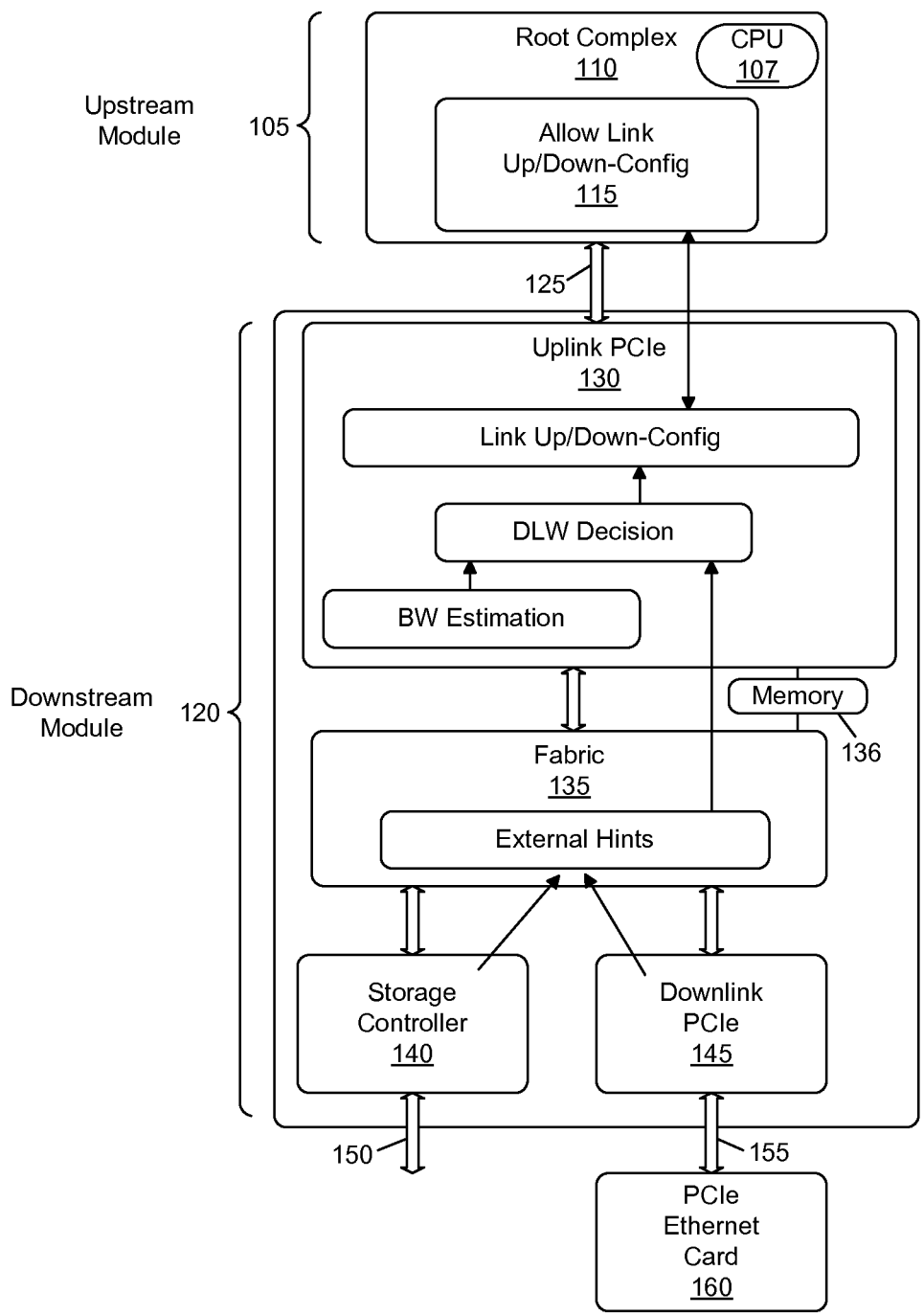
FIG. 1 includes a block diagram of a device including upstream and downstream modules in an embodiment of the invention.

For an example regarding integrated and non-integrated ports or endpoints, FIG. 1 includes a block diagram of a device including upstream and downstream modules in an embodiment of the invention. System 100 includes "upstream" device 105 and "downstream device" 120. Upstream device 105 may include processor 107, root complex 110, and a memory 115 including instructions for allowing "up configuration" (i.e., increasing width of a link) and "down configuration" (i.e., decreasing width of a link). Link 125 may include a PCIe link.

Downstream device 120 may include a chipset having various components, including PCIe controller 130, fabric 135, and storage controller 140. Storage controller 140 may constitute an "integrated endpoint" or port that has its own bandwidth requirements. Also, downlink 145 may constitute a PCIe port coupled to a downstream PCIe device that is not integrated into module 120. Such a downstream device may include, for example, PCIe Ethernet card 160, which includes a downstream endpoint with its own bandwidth requirements. PCIe controller 130 may couple to one or more memories 136 having instructions that function as state machines to enable up and down link configurations, as well as bandwidth (BW) estimation and decisions regarding dynamic link width (DLW) of link 125. Various embodiments for controller module 130 are discussed in the flowcharts discussed below.

As a general note, at times BW estimation and DLW decision-making instructions are said to be included in PCIe controller 130. This is for ease of explanation and is not meant as a limitation. For instance, in embodiments BW estimation and DLW decision-making instructions/state machines, and the like may be included in other areas such as, for example, fabric 135 depending on whichever area is more suitable/convenient for implementation. For example, in one embodiment BW estimation and DLW decision-making instructions/state machines are included in fabric 135 with appropriate registers being set within the controller.

An embodiment includes a policy based on hardware autonomous decision making. PCIe controller 130 monitors runtime bandwidth requirement on uplink 125 and makes a decision to up-configure or down-configure the link. In an embodiment, root complex 110 is upstream from PCIe controller 130, which is located in downstream device 120. Root complex 110 and any upstream port of module 105 may, in one embodiment, simply follow the link width negotiations from controller module 130 and cooperate with module 130 to implement up or down configurations. Root complex 110 may have no role in any bandwidth monitoring, instead leaving such monitoring to controller module 130.

Regarding link 125, note that a PCIe structure is hierarchical, starting at the root complex. A PCIe link, such as link 125, couples root complex 110 to a downstream device, such as devices 120 and 160 (which is located downstream from device 120). From the perspective of a downstream device such as module or device 120, link 125 is an "uplink" to host 105. However, link 125 is a "downlink" from the root complex 110 perspective. Link 125 may include ingress and/or egress lanes that allow traffic in both directions.

Figure 2A:
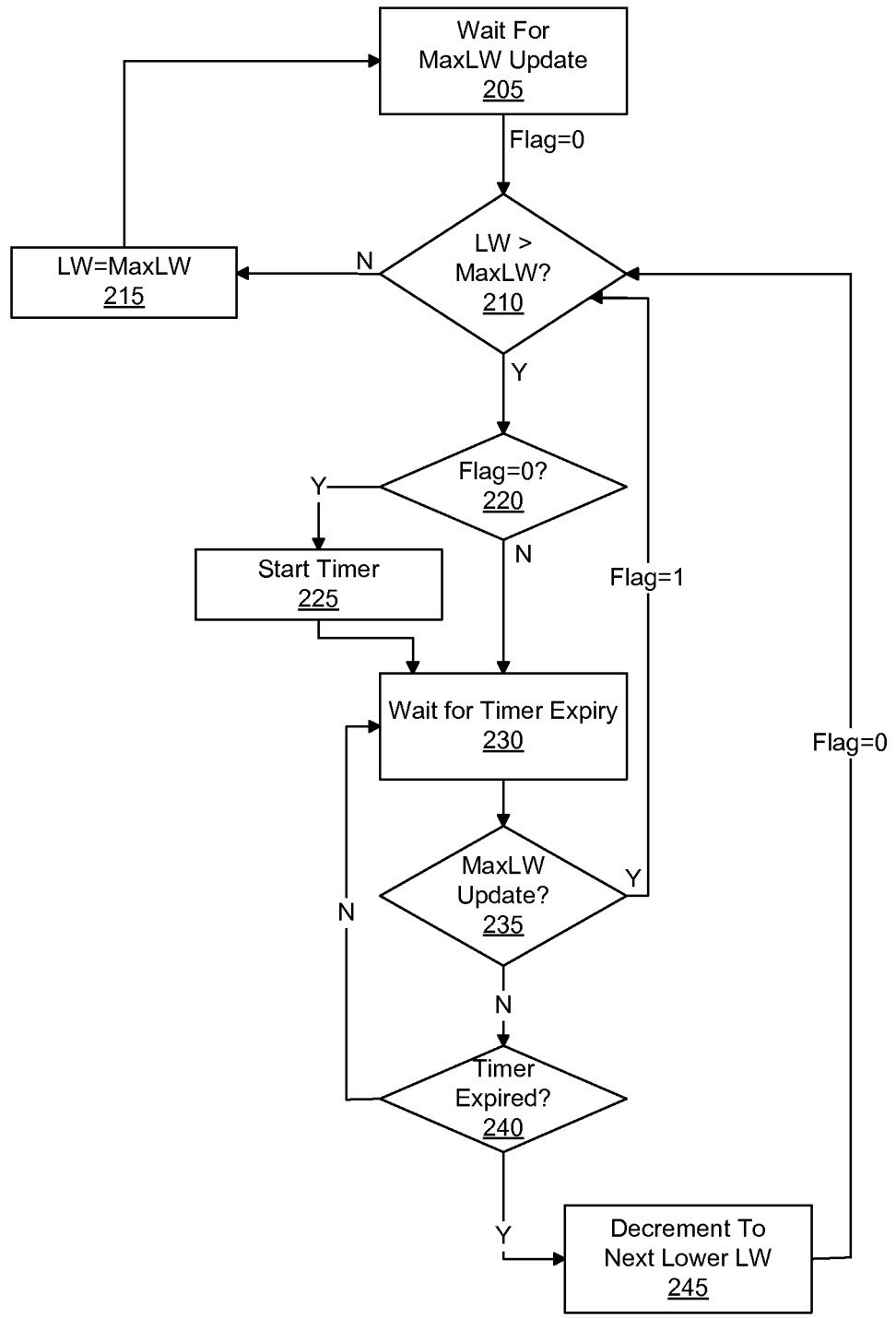
FIGS. 2a-b include a flow chart and related bandwidth chart regarding an embodiment of the invention for adjusting link width.
Figure 2B:
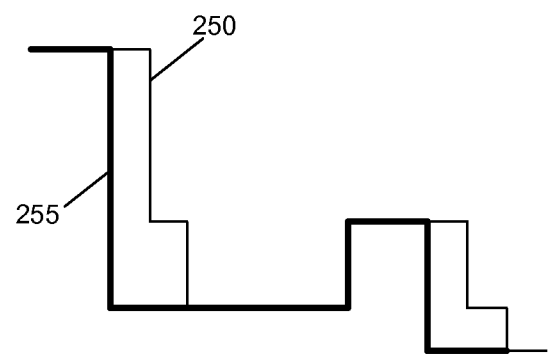

FIGS. 2a-b include a flow chart and related bandwidth chart regarding an embodiment of the invention for adjusting link width. Block 205 includes waiting for an update of the value "MaxLW", which concerns the maximum line width needed by downstream device 120 and device 160. This MaxLW may be based on integrated endpoints (e.g., storage controller 140 integrated within downstream module 120), non-integrated endpoints (e.g., PCIe Ethernet card not integrated with downstream module 120, and hence PCIe controller 130) and their related ports (e.g., 155), and combinations of integrated and non-integrated endpoints.

Various embodiments of the invention may determine required bandwidth (e.g., MaxLW) in various ways. A bandwidth monitoring mechanism monitors the bandwidth requirement of the traffic over the PCIe link. Such mechanisms, in general, include monitoring the command/data queues, available free credits, buffer utilization, accumulating actual data packets over a given interval, and the like. Various performance monitors can be used to this effect.

In one embodiment of bandwidth monitoring, PCIe controller 130 counts the queue depth using, for example, a leaky bucket algorithm in the ingress and egress ports over a window timer. Such ports may include ports 150, 155, and/or the port coupling controller 140 to fabric 135.

Another embodiment involves measuring the actual bandwidth by counting the packet size over a period of time (e.g., measured by a window timer). Such a window may be about 300, 400, 500, 600, 700 microseconds and the like. The measurement provides traffic bandwidth headed out of the controller (i.e., egress) and headed into the controller (i.e., ingress). For example, controller 130 measures the bandwidth going to host processor 107 ("Egress BW") and away from host processor 107 ("Ingress BW"). The "Net BW" request is then the larger of the Egress bandwidth ("Egress BW") and the Ingress bandwidth ("Ingress BW"). Thus, by monitoring the actual traffic controller 130 can accumulate bandwidth utilization over a period of time measured by, for example, a timer.

In another embodiment, PCIe controller 130 receives inputs from integrated endpoints (e.g., device 140) and downstream ports (e.g., 160) about their respective maximum bandwidth requirement. Controller 130 then aggregates the individual inputs to compute the net uplink bandwidth requirement. A connection rate based scoring system may be used to allow the participating functions (i.e., functions such as storage associated with storage controller 140) to specify their maximum bandwidth requirement based on, for example, the number of active lanes and the operating speed.

In an embodiment, the bandwidth requirement is dynamically computed by accounting for port connections as well as connection speeds. For example, an integrated 8-port 6 Gb/s SATA controller can support a maximum unidirectional bandwidth of 48 Gb/s if all 8 ports are active (i.e., "accounting for port connections"=8 port connections*6 Gb/s per port=48 Gb/s of needed bandwidth), but only 12 Gb/s if only 2 of the ports are active (i.e., 2 port connections*6 Gb/s per port=12 Gb/s of needed bandwidth). A 6 Gb/s connection is counted as a 4×1.5 Gb/s connection. Likewise, a link that is untrained/unconnected or is in a power saving state (e.g., L0 for PCIe or partial/slumber for SAS/SATA) is counted as 0 Gb/s. This makes the approach independent of the actual link protocol, and accommodates all types of integrated I/O endpoints and ports (e.g., link protocols such as SATA/SAS, PCIe, USB, and their various generational speeds).

Regarding a "scoring system", in an embodiment controller 140 may require 2 Gb/s (which according to a look up table may equal 5 points) and card 160 may require 8 Gb/s (which according to a look up table may equal 20 points). The scores may be added together to net 25 points, which may equate to a width of 4. However, in another embodiment the scores may be weighted differently. For example, controller 140 may be weighted more heavily than card 160 (e.g., a 2:1 controller/Ethernet card ratio) to attempt to normalize different link speeds between items 140 and 160.

More generally, in one embodiment a "scoring system" allows each participating endpoint to compute its dynamic maximum bandwidth requirement. The maximum bandwidth requirement per endpoint may be the sum of the operating speed per lane of all active lanes (where a lane that is unused, untrained, and/or idle is allocated a zero bandwidth requirement). This system also accounts for effective payload bandwidth by scaling for 8b/10b encoding present in some IO protocols. Weighting may be assigned to favor certain endpoints over others. The IOSF sideband message allows the bandwidth requirement to be reported to a granularity level of, for example, 0.5 Gb/s.

Each participating function (e.g., controller 150, card 160) can provide its maximum bandwidth requirement to the uplink controller using, for example, a message over an internal fabric or through direct wires. In one embodiment, the downstream ports send a sideband message (e.g., posted unicast message with data, Opcode) to the upstream controller to avoid using dedicated wires and also to free up the primary path. The aggregation of such inputs from all participating functions (and hence, integrated and non-integrated endpoints) provides the maximum bandwidth requirement. Thus, an integrated 12 G SAS controller (e.g., controller 140) and x8 PCIe downlink (e.g., Downlink PCIe 145) are each functions that may each send a sideband message to the switch fabric 135 containing their respective maximum bandwidth requirement. These updates may be provided to PCIe controller 130 either at an expiration of a window timer or at bandwidth value change.

Once the required bandwidth is known, controller 130 may determine the appropriate link 125 width. In an embodiment controller 130 compares the bandwidth requirement against the supported widths. For example, PCIe allows a xN link to be reconfigured into lower supported widths down to x1. Specifically, a x8 PCIe link may be configured as a x8, x4, x2, or x1 width link translating to a respective maximum bandwidth of 64 Gb/s, 32 Gb/s, 16 Gb/s and 8 Gb/s respectively. A look up table, stored in memory coupled to controller 130, may map the bandwidth requirement against one of the supported link widths.

Returning to FIG. 2a, as explained above there are various ways to determine required bandwidth. After such a determination has been made, in block 205 a MaxLW value may be received. As explained above, this may be received via a sideband message from one or more integrated and non-integrated endpoints (e.g., controller 150, PCIe Ethernet Card 160, and/or downstream ports coupled to link 150, and the like). A flag is set to 0. In block 210, the present width (LW) is compared to the desired bandwidth (MaxLW). If the updated link width is greater than the current link width, the controller "immediately" (a relative term) transitions (e.g., in less than 5 or 10 microseconds so as to minimize latency) to a higher bandwidth in order to avoid incurring performance degradation due to up-configuration latency (see block 215). When enabled, PCIe controller 130 trains to the link width defined in its configuration register (e.g., upcfgctl register). If there is a change in the value (see block 215), the controller may finish sending the message in flight and initiate retraining to the new width. The DLW policy determines the immediacy of this transition, and modifies the register as soon as the bandwidth requirement goes up.

In an embodiment, the actual PHY level up or down configuration may require both upstream module 105 and downstream module 120 to support dynamic width configuring. If both endpoints of the PCIe link support up configuration, then the PCIe uplink controller 130 of the downstream device 120 may initiate transition to the new width determined by the dynamic link policy.

If the updated link width is lower than the current link width (see block 220), the controller may filter the request using, for example, finite impulse response (FIR) filters, running average filters, and/or window timers before down-configuring to the next lower width. In an embodiment, if the flag setting=0 (indicating this is the first trip through this portion of the flow chart) then in block 225 a timer is started. While waiting for the timer to expire (block 230) the controller checks for any MaxLW update. If there is such an update the process continues to block 210 (albeit with the flag now set to 1). If no update is present the process continues to block 240. If the timer has finally expired with the needed bandwidth still less than the presently allotted width can handle, then in block 245 controller 130 decrements to the next lower LW. For example, if LW is set for 8 lanes it may be decreased to 4 lanes. Upon subsequent trips through the flow chart, the LW may decrement from 4 lanes to 2 lanes, and 2 lanes to 1 lane.

Thus, in an embodiment down configuration is based on timer expiration, and up configuration is relatively immediate based on maximum link width (MaxLW) updates. This "non-immediate" down configuration of link 125 width protects against chattering and performance throttling due to frequent up-configuration and down-configuration cycles. Thus, FIG. 2 shows an illustrative link width decision flow based on "hints" received from participating functions.

FIG. 2b tracks actual link width (250) as a function of maximum link width requirement (255), showing how link width lags and adjusts to required bandwidth.

Other embodiments based on bandwidth accumulation over window timers may up-configure the link when a high watermark (i.e., upper threshold) is crossed during a counting interval, or down-configure the link when the traffic is below a low watermark (i.e., lower threshold) over the counting interval. For example, FIGS. 3a-b include a flow chart and related bandwidth chart regarding an embodiment of the invention for adjusting link width.

In block 305 a timer is started and the accumulation of bandwidth requirement begins. In block 310 if the accumulated bandwidth requirement exceeds an upper threshold (Upth) then an up configuration takes place relatively immediately (block 315) (e.g., in less than 5 or 10 microseconds so as to minimize latency). However, if the accumulated bandwidth requirement does not exceed the upper threshold then the process may determine if the timer has expired (block 320). If the timer has not expired, then the process returns to block 310. If the timer has expired, in block 325 it is determined if the accumulated bandwidth requirement is greater than a lower threshold (DnTh). If yes, the process returns to block 305 and a new time period begins. If no, then in block 330 controller 130 decrements to the next lower LW. For example, if LW is set for 8 lanes it may be decreased to 4 lanes. Upon subsequent trips through the flow chart, the LW may decrement from 4 lanes to 2 lanes, and 2 lanes to 1 lane.

Figure 3A:
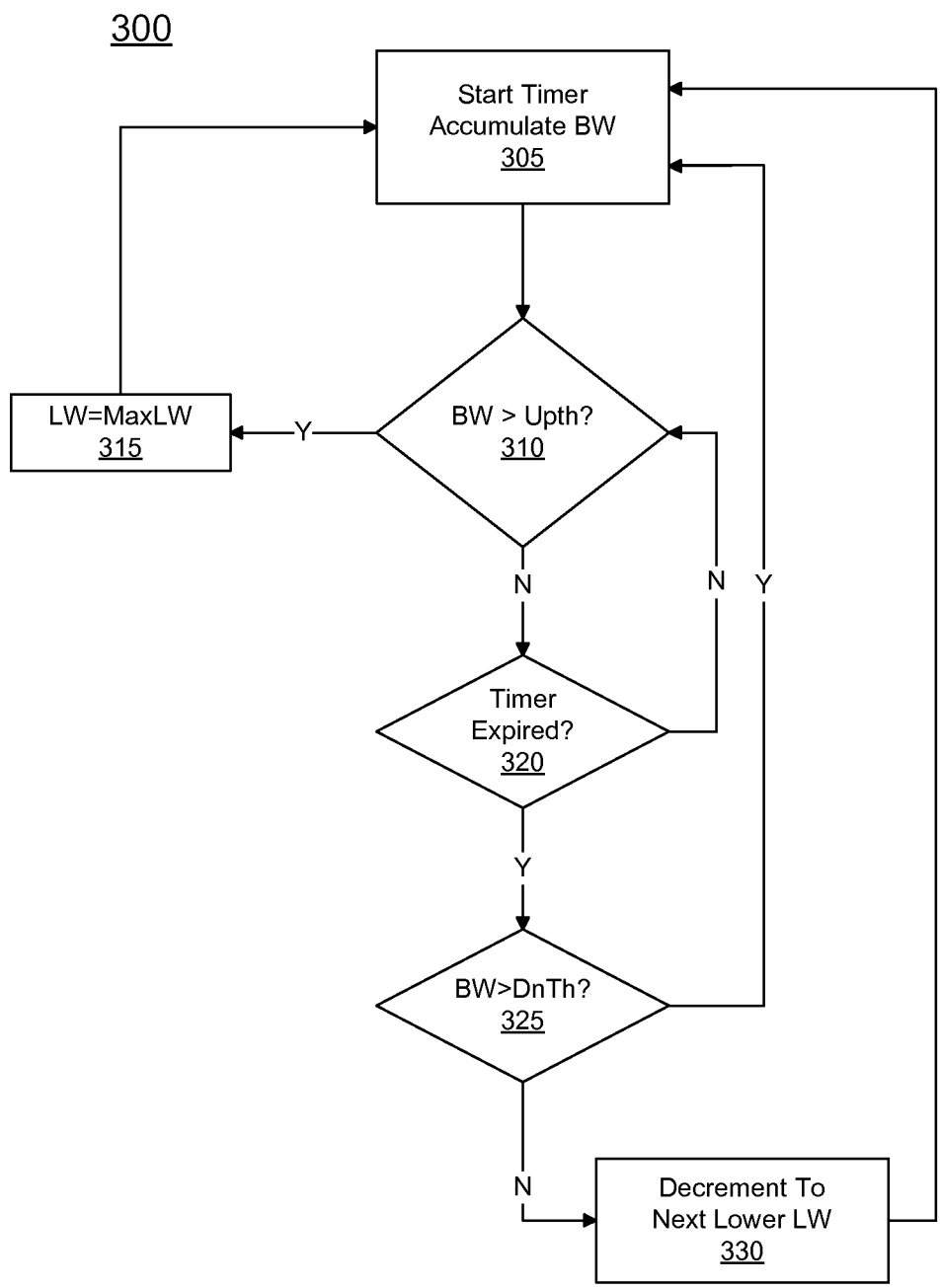
FIGS. 3a-b include a flow chart and related bandwidth chart regarding an embodiment of the invention for adjusting link width.
Figure 3B:
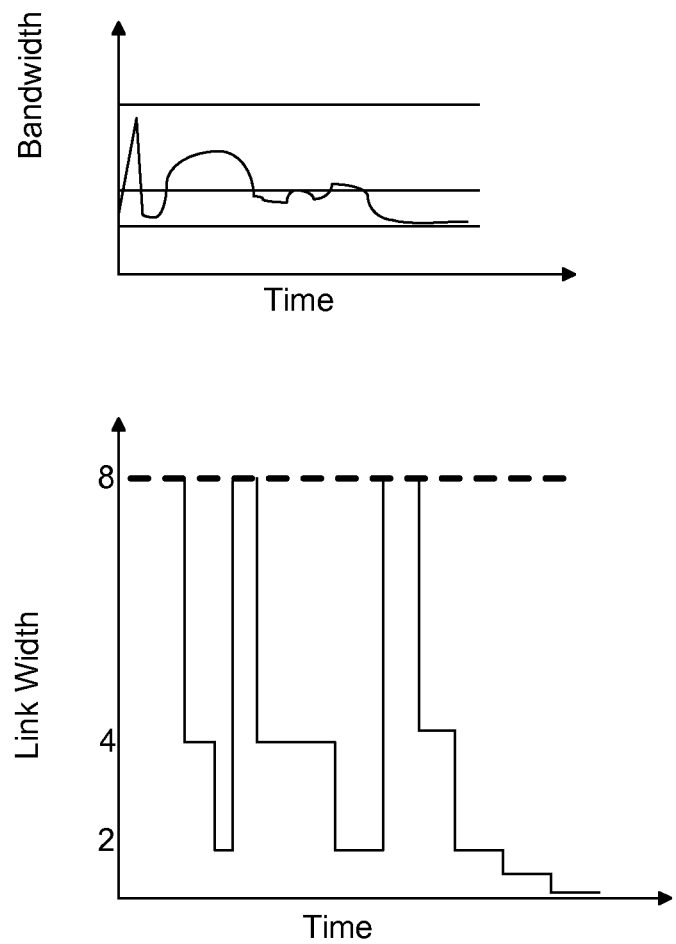

FIG. 3b illustrates how required bandwidth drives up configuration and down configuration, showing how link width varies according to bandwidth requirements meeting and failing to meet various thresholds.

Figure 4:
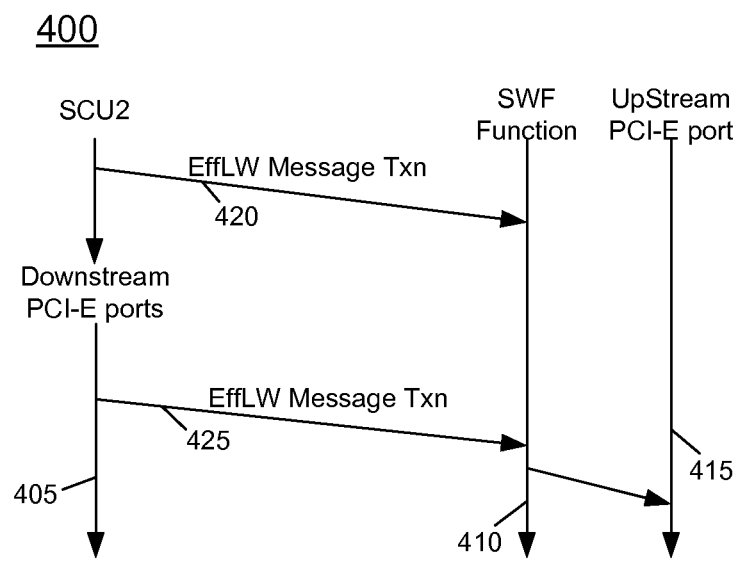
FIG. 4 includes a schematic message transfer diagram in an embodiment of the invention.

FIG. 4 includes a schematic message transfer diagram in an embodiment of the invention. Line 405 represents downstream PCIe ports such as PCIe Ethernet Card 160 and storage controller 150. Within one time period interval (see time in block 305 of FIG. 3a) two effective link width message transmissions (EffLW Mess Txn) are sent and accumulated switch fabric 135 (see line 410. Switch Fabric (SWF) 135). (In another embodiment the policy may reside in controller 130 instead of fabric 134, and consequently accumulation may occur at controller 130.) Then an appropriate configuration command (up or down configuration command contained within a configuration write message ("CfgWr Mesg")) is sent from fabric 135 to controller 130 and then, for example, host processor (see line 415) and root complex 110.

Figure 5:
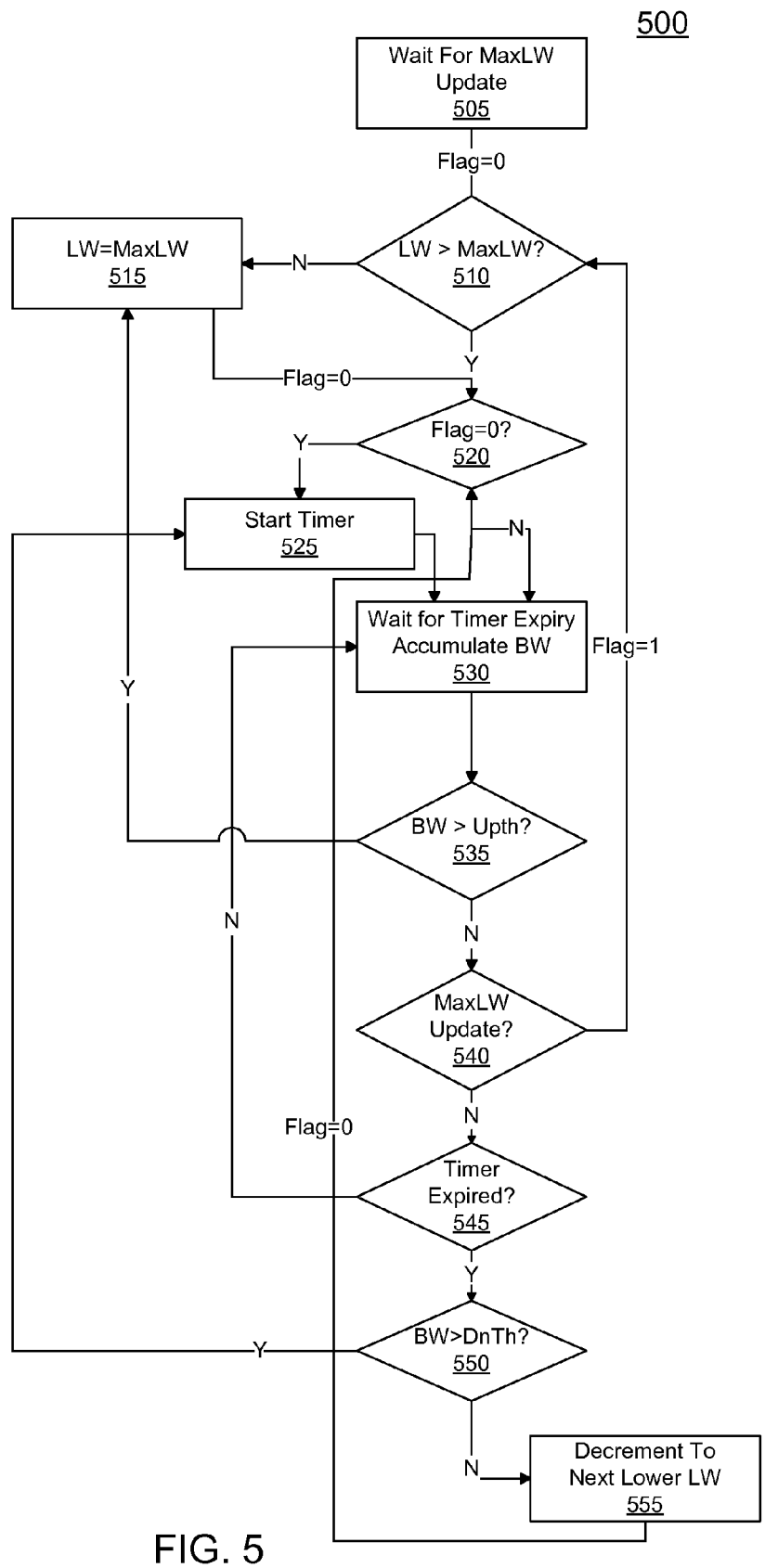
FIG. 5 includes a flow chart and related bandwidth chart regarding an embodiment of the invention for adjusting link width.

FIG. 5 includes a flow chart and related bandwidth chart regarding an embodiment of the invention for adjusting link width. Specifically, FIG. 5 includes a hybrid of FIGS. 2a and 3a that combines link width requirement based on maximum bandwidth hints (FIG. 2a) and bandwidth accumulation or aggregation (FIG. 3a). This hybrid flow may provide a beneficial trade-off between power savings (e.g., due to reduced fan and power supply unit usage) and latency impact.

For brevity, each block of FIG. 5 will not be addressed again. Blocks 505, 510, 515, 520, 525 have similarly numbered counterparts (205, 210, 215, 220, 225) in FIG. 2a. However, block 530 deviates from FIG. 2a and adds bandwidth accumulation (see FIG. 3a) while waiting for a time period to expire. This leads to block 535 (see FIG. 3a block 310) before proceeding to blocks 540 (block 235), 545 (blocks 240, 320), and 550 (block 325). The process then advances to block 555.

At times link width may go down even when bandwidth usage is going up. This may be due to, for example, embodiments where the link width decision is threshold based. Thus, the bandwidth may be going up, but if the elevated bandwidth is still below the appropriate threshold then the controller 130 logic may still decide to reduce the link width or maintain the link width.

In another embodiment, uplink 125 width may be limited based on thermal sensors (instead of or in addition to bandwidth factors discussed above). For example, if the temperature exceeds predetermined thresholds, the link may be limited to a narrower width in order to save power, thereby providing thermal relief.

In an embodiment, variable widths (e.g., x8, x4, x2, x1) may not be supported by both upstream 105 and downstream 120 modules. However, during link initialization, controller or processor 107 may train to all possible widths and log unsupported widths. Controller 130 may down configure based on bandwidth requirements and log unsupported widths during normal operation (and then avoid those unsupported widths).

Thus, embodiments described above help not only dynamically configure the width of PCIe links, but also determine how to best configure the appropriate link width. This helps avoid situations where PCIe links are almost always active even at very low traffic rates (which further causes PCIe devices to consume power close to the thermal design power (TDP) value even when the utilization is near idle). Embodiments achieve these benefits based on, for example, run-time monitoring of bandwidth requirement and intelligent decision making on the opportunistic down configuration and immediate up configuration of a link to provide power savings without impacting performance.

An embodiment defines a link-connectivity and connection-rate based system that computes the maximum bandwidth requirement, but without being computation intensive and without sustaining significant power penalties. For example, power penalties are limited because various embodiments have logic that is active primarily only when a change is detected (instead of running continuously). Also, the window intervals (e.g., see block 230) are relatively long (e.g., hundreds of microseconds).

Further, embodiments provide a mechanism by which downstream ports or integrated ports can convey their maximum bandwidth requirement. This information may be efficiently conveyed via a sideband fabric. This is in contrast to any attempt by a root complex or other upstream device 105 effort to gather bandwidth information. For example, while integrated storage controller 140 is coupled to root complex 110 via PCIe uplink 125, storage controller 140 may also be connected to a number of storage drives (not shown in FIG. 1). Thus, how many SAS/SATA drive links are active at any time is known to storage controller 140, not root complex 110. Without messaging mechanisms as described herein, the PCIe controller cannot deduce the level of needed storage drive connectivity and bandwidth.

Embodiments contrast with inefficient methods where the PCIe link is always trained to its maximum width whenever a message/data has to be transmitted, regardless of the message size or queue depth.

An embodiment implements a policy that enables energy-efficient I/O operation by delivering a performance-power loadline for PCIe traffic. For example, server platforms have a high PCIe port count (e.g., 40 ports per socket and 2-4 sockets per platform). Several PCIe devices are attached to server platforms, including storage controllers (e.g., SATA/SAS controllers), Ethernet controllers, and the like. By enabling various embodiments described above server platforms can demonstrate significant power savings at low platform utilization.

Thus, an embodiment includes a system comprising an upstream module including a host processor/controller (107); a downstream module including a processor/controller (130); and a link (125) having a dynamically configurable width, that couples the downstream module to the upstream module. Controller 130 may couple to a memory including instructions that when executed enable the controller (after the controller has already been initialized) to both determine an I/O bandwidth for the downstream module and dynamically adjust the width of the link based on the determination.

The controller may immediately increase, before a first time period transpires (e.g., timer of block 225), the width of the link when the determined bandwidth is greater than the width of the link (e.g., block 215), and non-immediately decrease the width of the link (e.g., block 245), after a second time period transpires (e.g., 240), when the determined bandwidth is less than the width of the link; the second time period being longer than the first time period.

An embodiment may include first and second downstream ports (e.g., controller 140 and card 160) that couple to the host via the controller (e.g., controller 130). The controller may determine the I/O bandwidth based on bandwidth requirements for both of the first and second downstream ports.

In an embodiment the PCIe controller may dynamically increase the width of the link when the determined bandwidth is greater than a first threshold (e.g., the present width LW) and dynamically decrease the width of the link to low width setting when the determined bandwidth is less than a second threshold. The second threshold may be the same as the first threshold (e.g., both are LW) or another value. Instead of or in addition to the immediately preceding scenario, the thresholds may relate to Upth and/or DnTh thresholds and the like.

Embodiments may be implemented in code and may be stored on a non-transitory storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions. Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. Components or modules may be combined or separated as desired, and may be positioned in one or more portions of a device.

As used herein a processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like. In some implementations, controller 130 and the like are intended to represent content (e.g., software instructions, etc.), which when executed implements the features described herein.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   coupling a downstream module, which includes a controller and a switch fabric, to an upstream module, which includes a host processor, via a link having a dynamically configurable width;
   initializing the controller; and
   after the controller has been initialized, the downstream module both determining an input/output (I/O) bandwidth for the downstream module and dynamically adjusting the width of the link based on the determination;
   wherein dynamically adjusting the width of the link comprises the downstream module immediately increasing, before a first time period transpires, the width of the link when the determined bandwidth is greater than the width of the link, and non-immediately decreasing the width of the link, after a second time period transpires, when the determined bandwidth is less than the width of the link; the second time period being longer than the first time period.

2. The method of claim 1, wherein first and second downstream ports couple to the host via the controller, the method comprising the downstream module determining the I/O bandwidth based on bandwidth requirements for both of the first and second downstream ports.

3. The method of claim 1 comprising the downstream module dynamically increasing the width of the link when the determined bandwidth is greater than a first threshold and dynamically decreasing the width of the link to a low width setting when the determined bandwidth is less than a second threshold.

4. The method of claim 3, wherein the first threshold is unequal to the second threshold.

5. The method of claim 3 comprising the downstream module, after already having decreased the width of the link to the low width setting, further dynamically decreasing the width of the link to a lower width setting, which is lower in width than the low width setting, when the determined bandwidth is less than a third threshold.

6. The method of claim 1 comprising determining a thermal value for a thermal sensor coupled to the downstream module, and dynamically adjusting the width of the link based on the determined value for the thermal sensor.

7. The method of claim 1, wherein first and second downstream ports couple to the host via the controller, the link is a peripheral component interconnect express (PCIe) link and the controller is a PCIe controller, and the downstream module includes a chipset that comprises the controller and the first and second downstream ports; the method comprising at least one of the controller and the switch fabric determining the I/O bandwidth based on bandwidth requirements for both of the first and second downstream ports.

8. The method of claim 7 comprising the downstream module:
   receiving first data, which corresponds to the bandwidth requirement for the first downstream port, via a sideband message originating from the first downstream port;
   receiving second data, which corresponds to the bandwidth requirement for the second downstream port, via a sideband message originating from the second downstream port; and
   determining the I/O bandwidth based on an aggregation of the first and second data.

9. The method of claim 1, wherein a first downstream port couples to the host processor via the controller; a second downstream port couples to the host processor via the controller;
   the downstream module includes a chipset that comprises the controller and the first downstream port but not the second downstream port; the method comprising the downstream module determining the I/O bandwidth based on bandwidth requirements for the first and second downstream ports.

10. The method of claim 1 comprising the downstream module:
    determining a first metric based on determining at least one of queue depth for the downstream module and a size of a packet processed by the downstream module; and
    determining the I/O bandwidth based on the first metric.

11. The method of claim 1 comprising the downstream module:
    determining the I/O bandwidth does not satisfy a threshold,
    starting a timer based on the determination that the I/O bandwidth does not satisfy the threshold, and
    decreasing the width of the link based on the timer expiration and after the timer expiration.

12. An apparatus comprising:
    a downstream module including a controller and a switch fabric;
    a link, having a dynamically configurable width, that couples the downstream module to an upstream module including a processor; and
    a memory, coupled to the controller, including instructions that when executed enable the downstream module, after the controller has already been initialized, to both determine an input/output (I/O) bandwidth for the downstream module and dynamically adjust the width of the link based on the determination;
    wherein dynamically adjusting the width includes dynamically increasing the width of the link when the determined bandwidth is greater than a first threshold and dynamically decreasing the width of the link to a low width setting when the determined bandwidth is less than a second threshold.

13. The apparatus of claim 12, wherein the memory further comprises instructions that when executed cause the downstream module to immediately increase, before a first time period transpires, the width of the link when the determined bandwidth is greater than the width of the link, and non-immediately decrease the width of the link, after a second time period transpires, when the determined bandwidth is less than the width of the link; the second time period being longer than the first time period.

14. The apparatus of claim 12 comprising first and second downstream ports that couple to the processor via the controller, wherein the memory further comprises instructions that when executed cause the downstream module to determine the I/O bandwidth based on bandwidth requirements for both of the first and second downstream ports.

15. The apparatus of claim 12 comprising:
a first downstream port that couples to the processor via the controller; and
a second downstream port that couples to the processor via the controller;
wherein the memory further comprises instructions that when executed cause the downstream module to determine the I/O bandwidth based on bandwidth requirements for the first and second downstream ports, and further wherein the downstream module includes a chipset that comprises the controller and the first downstream port but not the second downstream ports.

16. The apparatus of claim 15 comprising instructions that when executed cause the downstream module:
receive first data, which corresponds to the bandwidth requirement for the first downstream port, via a sideband message originating from the first downstream port;
receive second data, which corresponds to the bandwidth requirement for the second downstream port, via a sideband message originating from the second downstream port; and
determine the I/O bandwidth based on an aggregation of the first and second data.

17. At least one machine accessible medium having instructions stored thereon, the instructions when executed on a downstream module cause the downstream module to: couple to an upstream module, which includes a host processor, via a link having a dynamically configurable width, the downstream module including a controller and a switch fabric;
initialize the controller; and
after the controller has been initialized, determine an input/output (I/O) bandwidth for the downstream module and dynamically adjust the width of the link based on the determination;
wherein dynamically adjusting the width comprises:
immediately increasing, before a first time period transpires, the width of the link when the determined bandwidth is greater than the width of the link, and
non-immediately decreasing the width of the link, after a second time period transpires, when the determined bandwidth is less than the width of the link; the second time period being longer than the first time period.

18. The at least one machine accessible medium of claim 17 further storing instructions that when executed on the downstream module cause the downstream module to determine the I/O bandwidth based on bandwidth requirements for both of first and second downstream ports that couple to the host via the controller.

19. The at least one machine accessible medium of claim 17 further storing instructions that when executed on the downstream module cause the downstream module to dynamically increase the width of the link when the determined bandwidth is greater than a first threshold and dynamically decrease the width of the link to a low width setting when the determined bandwidth is less than a second threshold.

* * * * *